(12) United States Patent
Shimizu

(10) Patent No.: US 8,188,892 B2
(45) Date of Patent: May 29, 2012

(54) MOVING VEHICLE SYSTEM AND METHOD OF DETECTING POSITION OF MOVING VEHICLE

(75) Inventor: Tetsuya Shimizu, Kyoto (JP)

(73) Assignee: Murata Machinery, Ltd., Kyoto (JP)

( * ) Notice: Subject to any disclaimer, the term of this patent is extended or adjusted under 35 U.S.C. 154(b) by 653 days.

(21) Appl. No.: 12/411,188

(22) Filed: Mar. 25, 2009

(65) Prior Publication Data

US 2009/0278710 A1     Nov. 12, 2009

(30) Foreign Application Priority Data

May 12, 2008   (JP) ................................. 2008-124801

(51) Int. Cl.
*G08G 1/123*     (2006.01)

(52) U.S. Cl. ............... 340/988; 340/539.21; 340/825.49

(58) Field of Classification Search .................. 340/988, 340/992, 995.1, 995.27, 539.21, 686.1, 685, 340/691.6, 825.49
See application file for complete search history.

(56) References Cited

U.S. PATENT DOCUMENTS

| | | | | |
|---|---|---|---|---|
| 5,213,047 A * | 5/1993 | Fujiwara et al. | ............... | 104/281 |
| 5,430,665 A * | 7/1995 | Jin et al. | ......................... | 702/163 |
| 7,605,998 B2 * | 10/2009 | Takaishi | ..................... | 360/78.04 |
| 7,751,866 B2 * | 7/2010 | Aoki et al. | ..................... | 600/424 |
| 7,840,163 B2 * | 11/2010 | Takayama et al. | ............. | 399/167 |
| 2008/0123111 A1 * | 5/2008 | Hori | ................................ | 356/620 |

FOREIGN PATENT DOCUMENTS

JP     2002-337037     11/2002

* cited by examiner

*Primary Examiner* — Daniel Previl
(74) *Attorney, Agent, or Firm* — DLA Piper LLP (US)

(57) ABSTRACT

A detection head has an array including a plurality of coils. Magnetic marks are arranged in a travel route at a pitch equal to the array length. By interaction between the magnetic marks and the coils, a position of a moving vehicle is determined based on the magnetic marks.

2 Claims, 7 Drawing Sheets

F I G. 4
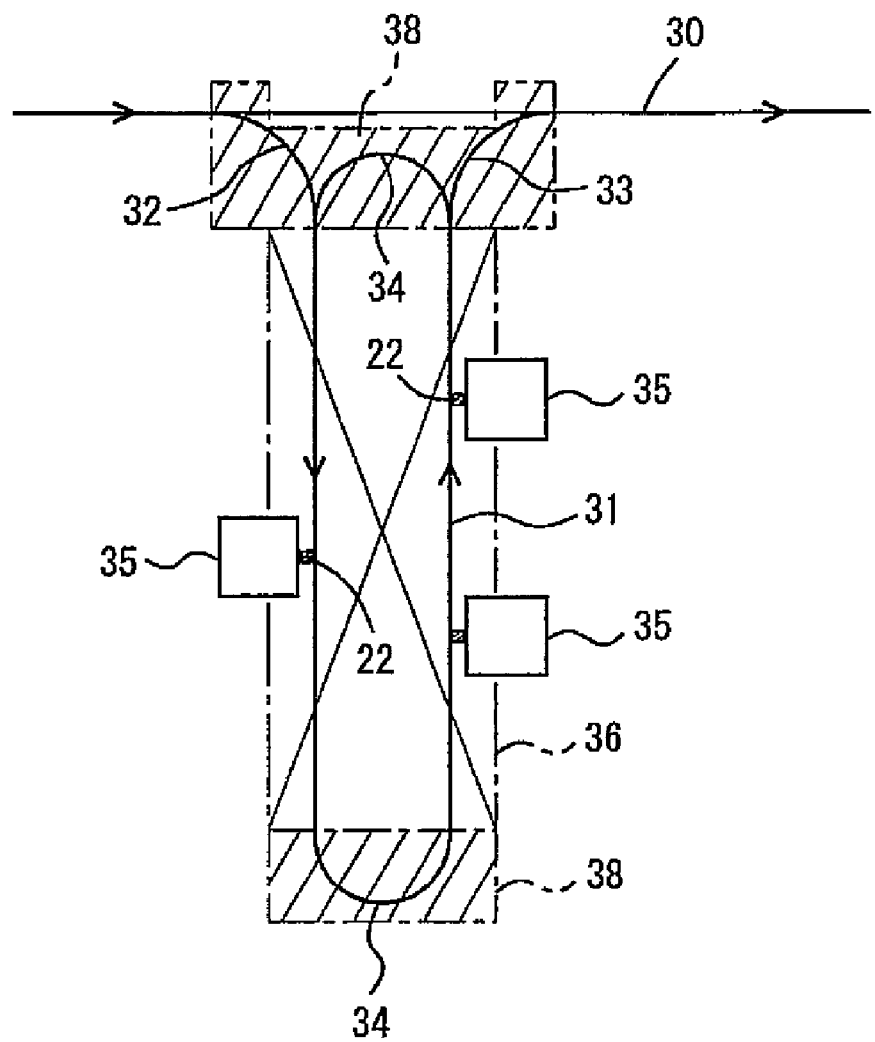

MOVING VEHICLE SYSTEM AND METHOD OF DETECTING POSITION OF MOVING VEHICLE

TECHNICAL FIELD

The present invention relates to a moving vehicle system. In particular, the present invention relates to position detection of a moving vehicle.

BACKGROUND ART

The inventor proposed a system using a combination of magnetic marks and a plurality of coils arranged as a coil array to continuously detect a position of a moving vehicle (Patent Publication 1: JP2002-337037A). There are constraints on the length of the magnetic marks. Therefore, in the Patent Publication 1, in use, the magnetic marks are continuously arranged without any gaps, and the magnetic mark to be detected is switched. Further, the length of a detection head having the coil array is shorter than the length of the individual magnetic marks, and the head is only affected by one magnetic mark.

However, it is difficult to provide the magnetic marks without any gaps along a long moving route. In an attempt to address the problem, the inventor studied a technique of providing magnetic marks at intervals, and detecting a position of a moving vehicle continuously without any gaps using a single detection head, and achieved the present invention.

DISCLOSURE OF THE INVENTION

Problems to be Solved by the Invention

An object of the present invention is to provide a segment where magnetic marks provided at intervals and a moving vehicle can be detected continuously using a single detection head.

Another object of the present invention is to make it possible to handle a segment where it is sufficient to achieve precise position detection only at certain positions, such as a stop position of the moving vehicle.

Still another object of the present invention is to control switching between a first segment and a second segment, while changing a detection range in the second segment in order to achieve position detection in the second segment with the same precision as in the first segment.

Means for Solving the Problems

The present invention relates to a moving vehicle system including a moving vehicle with a detection head having a coil array formed by arranging a plurality of coils along a moving direction of the moving vehicle, and a segment where magnetic marks are arranged along a moving route of the moving vehicle at a pitch equal to length of the coil array in order to determine a position of the moving vehicle in the segment continuously based on an output from the detection head.

Further, the present invention relates to a method of detecting a position of a moving vehicle, including the steps of:

providing the moving vehicle with a detection head having a coil array formed by arranging a plurality of coils along a moving direction of the moving vehicle;

arranging magnetic marks along a predetermined segment of a moving route of the moving vehicle at a pitch equal to length of the coil array; and detecting a position of the moving vehicle in the segment continuously based on an output from the detection head.

Preferably, the segment is designated as a first segment, and the moving vehicle system further includes, in addition to the first segment, a second segment where the magnetic marks are arranged along the moving route at intervals of a distance that is wider than the pitch.

Particularly preferably, the moving vehicle system further includes means for detecting presence of the magnetic mark to identify the first segment or the second segment, and means for changing a detection range of the detection head to output a position of the moving vehicle with predetermined precision over an entire range in the first segment, and output a position of the moving vehicle with the predetermined precision in the second segment for an area around the magnetic mark that is narrower than the pitch.

ADVANTAGES OF THE INVENTION

In the present invention, a segment where magnetic marks are arranged along a moving route at a pitch equal to the length of the coil array is provided.

In the segment, the magnetic marks are present adjacent to both ends of the coil array, or one magnetic mark is present inside both ends of the coil array. In the case where one magnetic mark is present inside both ends of the coil array, the position can be determined easily. Further, in the case where two magnetic marks are provided in the vicinity of both ends of the coil array, the coils in the vicinity of the coils interact with the magnetic marks, and the position can be determined as well. Thus, in the present invention, the position of the moving vehicle can be determined continuously in the above segments. It is not necessary to provide the magnetic marks seamlessly without any gaps. One detection head can be used sufficiently.

Since the pitch of the magnetic marks is equal to the length of the coil array at the detection head, the detection head interacts with the magnetic marks for the length corresponding to one magnetic mark at all times. For example, regardless of whether the magnetic marks are provided at both ends of the coil array, or the magnetic marks are present at the center of the coil array, the total length of the magnetic marks facing the coil array is equal to the length of one magnetic mark. Therefore, the detection conditions of the magnetic marks do not change regardless of the position, and the detection can be performed easily.

In a possible application, the frequency of passing of the moving vehicle is low, and for example, it is sufficient to identify the current position only in the vicinity of certain positions such as a station. Further, there are segments where position detection using the magnetic marks is difficult, such as curve, diverge, and merge sections. In such sections, if a second segment where magnetic marks are provided along the moving route at wide intervals are provided, position detection can be performed only at necessary positions.

Further, in the case where means for detecting the presence of the magnetic mark is provided, based on the presence of the magnetic mark at a predetermined position, the first segment or the second segment can be identified easily. Further, preferably, a detection range of the detection head is changed to output a position of the moving vehicle with predetermined precision over an entire range in the first segment, and output a position of the moving vehicle with the predetermined precision in the second segment for an area around the magnetic mark that is narrower than the pitch. In this manner, also in the second segment, position detection can be performed within the detection range of the detection head with the same precision as in the first segment.

BRIEF DESCRIPTION OF THE DRAWINGS

FIG. 4 is a view showing an entire range detection segment, a discrete detection segment, and a detection disabled segment.

DESCRIPTION OF THE NUMERALS

Figure 1:
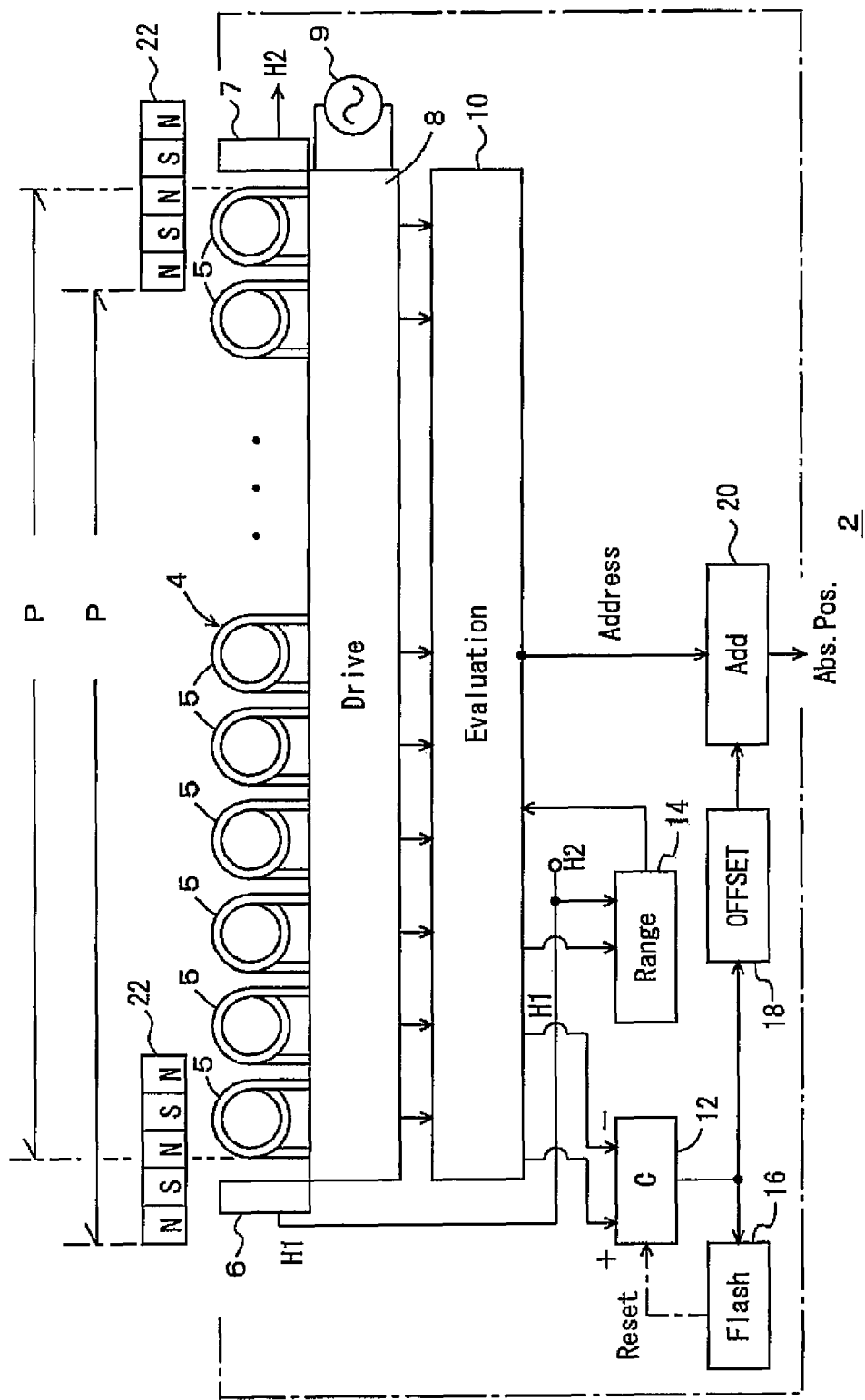
FIG. 1 is a block diagram showing a layout of a detection head for detecting an absolute position and magnetic marks.

2: detection head
4: coil array
5: coil
6, 7: hall element
8: drive circuit
9: AC power source
10: evaluation circuit
12: counter
14: detection range switching unit
16: flash memory
18: offset table
20: adder
22: magnetic mark
24: travel route
30: inter-bay route
31: intra-bay route
32: diverge section
33: merge section
34: curve section
35: load port
36: discrete layout segment
38: detection disabled segment
40: stacker crane
41: mast
42: elevation frame
43: transfer apparatus
P: coil array length Embodiment FIGS. 1 to 7 show a moving vehicle system according to an embodiment. FIG. 1 shows a layout of a detection head 2 and magnetic marks 22. A reference numeral 4 denotes a coil array made up of a plurality of coils, e.g., arranged in one row in a moving direction of a moving vehicle. Further, a pair of hall elements 6, 7 are provided on both of front and back sides in a running direction of the coil array 4 to detect the presence of the magnetic marks 22. Any magnetic sensor may be used instead of the hall elements 6, 7. In an extreme case, the hall elements 7, 6 may be replaced with coils at both ends of the coil array 4. A reference numeral 8 denotes a drive circuit for applying A/C current from an A/C power source 9 to each coil 5, and outputting an address, e.g., based on electrical current flowing through the individual coils 5, or the voltage, or the phase of electrical current or voltage applied to the individual coils 5.

By the sharp change in a trajectory of the output from the evaluation circuit 10, a counter value of a counter 12 is incremented or decremented by 1. A detection range switching unit 14 switches a detection range by signals from the hall elements 6, 7 and switches the detection mode between entire range detection and discrete layout. In the entire range detection mode, the detection range corresponds to the length P of the coil array 4, i.e., corresponds to the array pitch of the magnetic marks 22. In the discrete layout mode, the detection range is narrower than the pitch P.

Based on the counter value, magnetic marks 22 that are currently being detected are identified. In preparation for restoration from blackout or the like, the counter value is stored in a non-volatile memory such as a flash memory 16. At the time of resetting from blackout or the like, the counter value stored in the flash memory 16 is set to the counter 12. An offset table 18 is used for converting the counter value to an offset. An adder 20 adds the address from the evaluation circuit 10 to the offset, and outputs a current position. The current position outputted from the detection head 2 is referred to as an absolute position. The absolute position is data determined by directly detecting the magnetic marks 22 independently of an internal sensor. The offset table 18 and the adder 20 may be provided in stages subsequent to the detection head 2. In the case where the current position is roughly recognized by an internal sensor such as an encoder, the output from the evaluation circuit 10 may be outputted directly from the detection head 2. In this case, conversion to the absolute position using the offset is not required.

The magnetic marks 22 are arranged into an array by alternately changing polarity of the permanent magnet. Instead of the array of magnets, a single magnet may be used. Further, instead of using the magnet, magnetizable material may used as the magnetic mark 22. The array pitch P of the magnetic marks 22 is equal to the detectable range by the coil array 4. In this case, as viewed from coil array 4, in total, one magnetic mark 22 is present in the detection range at all times. It should be noted that the length of the coil array 4 is equal to the detectable range. Since the distance between the magnetic mark 22 and the coil is very small, the magnetic flux applied from the magnetic mark 22 to the coil array 4 is constant. Distribution of the magnetic flux is changed depending on a relative position of the coil array 4 relative to the magnetic marks 22. Depending on the distribution of the magnetic flux, the electrical current flowing the individual coils is changed. The change of the electrical current herein means, e.g., a change in the absolute value or phase of electrical current, or a change in the voltage required for allowing electrically current of a constant level to flow through the individual coils 5. By evaluating distribution of electrical current flowing the individual coils 5 using the evaluation circuit 10, an address is determined. The address represents a position obtained by dividing the detection length P of the coil array by a predetermined resolution.

The length of the coil array 4, i.e., the detection length of the coil array 4 is equal to the array pitch P of the magnetic marks 22. Thus, the total amount of magnetic flux applied to the coil array 4 from the magnetic mark 22 becomes constant at any position, and detection can be performed easily. For example, in the case where the length of the coil array is 300 mm, the arrangement pitch P of the magnetic marks 22 is within 300 mm±2 mm. As the allowable error gets smaller, detection precision becomes high. The allowable error is determined by the required detection precision.

Figure 2:
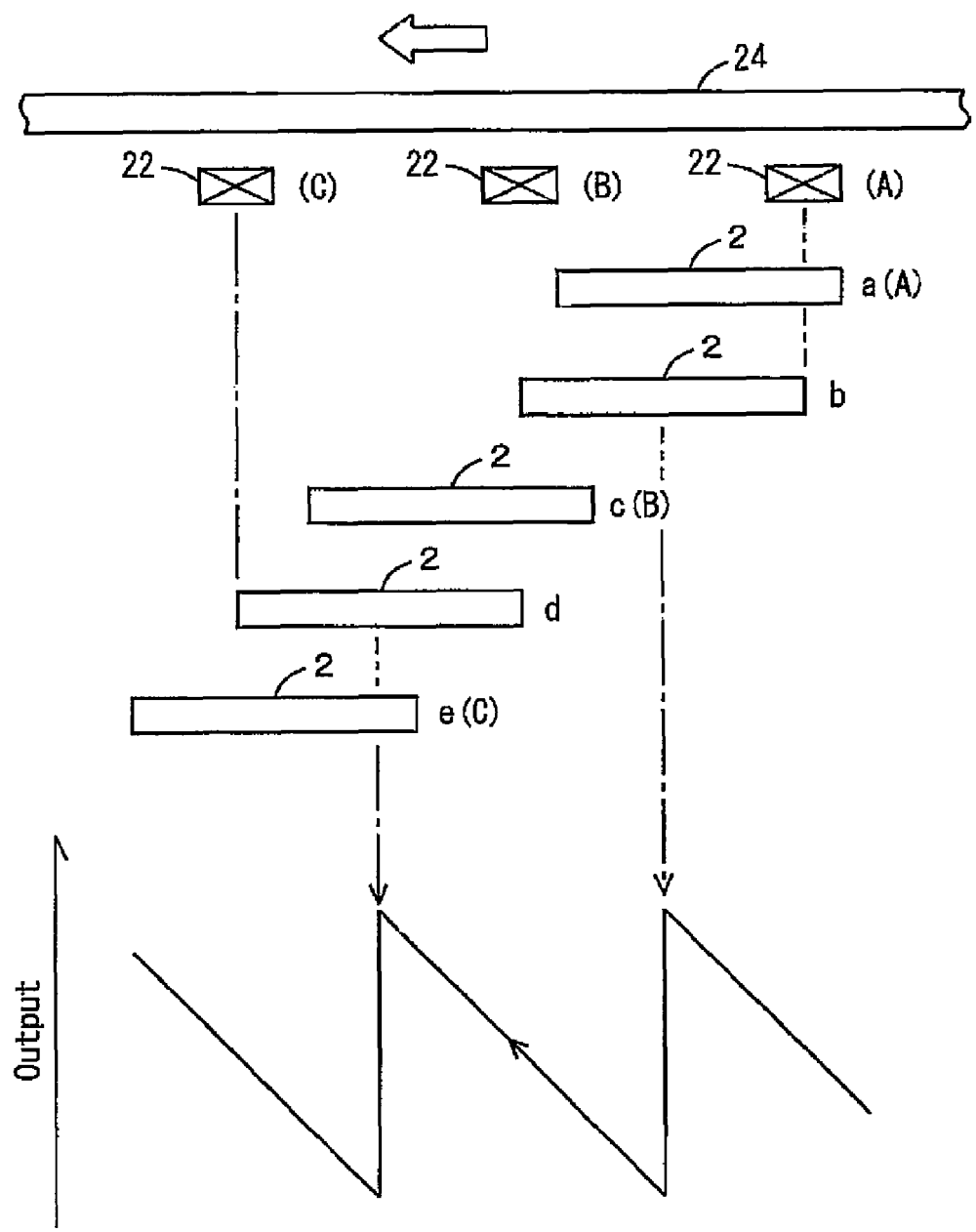
FIG. 2 is a view showing the relationship between a position of the detection head relative to the magnetic marks and output according to an entire range detection specification.

FIG. 2 shows an output from the detection head 2 according to entire range detection specification. A reference numeral 24 denotes a travel route. In FIG. 2, the moving vehicle moves from the right to the left. The magnetic marks 22 are arranged at a pitch equal to the length of the coil array. In the embodiment, it is assumed three magnetic marks (A), (B), and (C) are provided in the order from the right to the left. When the detection head 2 is located at a position "a", the magnetic mark (A) is detected. When the right end of the detection head 2 (to be precise, the right end of the coil array 4) reaches the center of the magnetic mark (B), the counter value is changed by 1. At this time, the detection head 2 is located at a position "b" in FIG. 2. Then, at a position "c", detection is performed only using the magnetic mark (B). At a position "d", since the left end of the coil array reaches the center of the magnetic mark (C), the counter value is further changed by 1. At a position "e", detection is performed using the magnetic mark (C). Thus, the address outputted from the detection head 2 is changed as shown on the lower side in FIG. 2.

Figure 3:
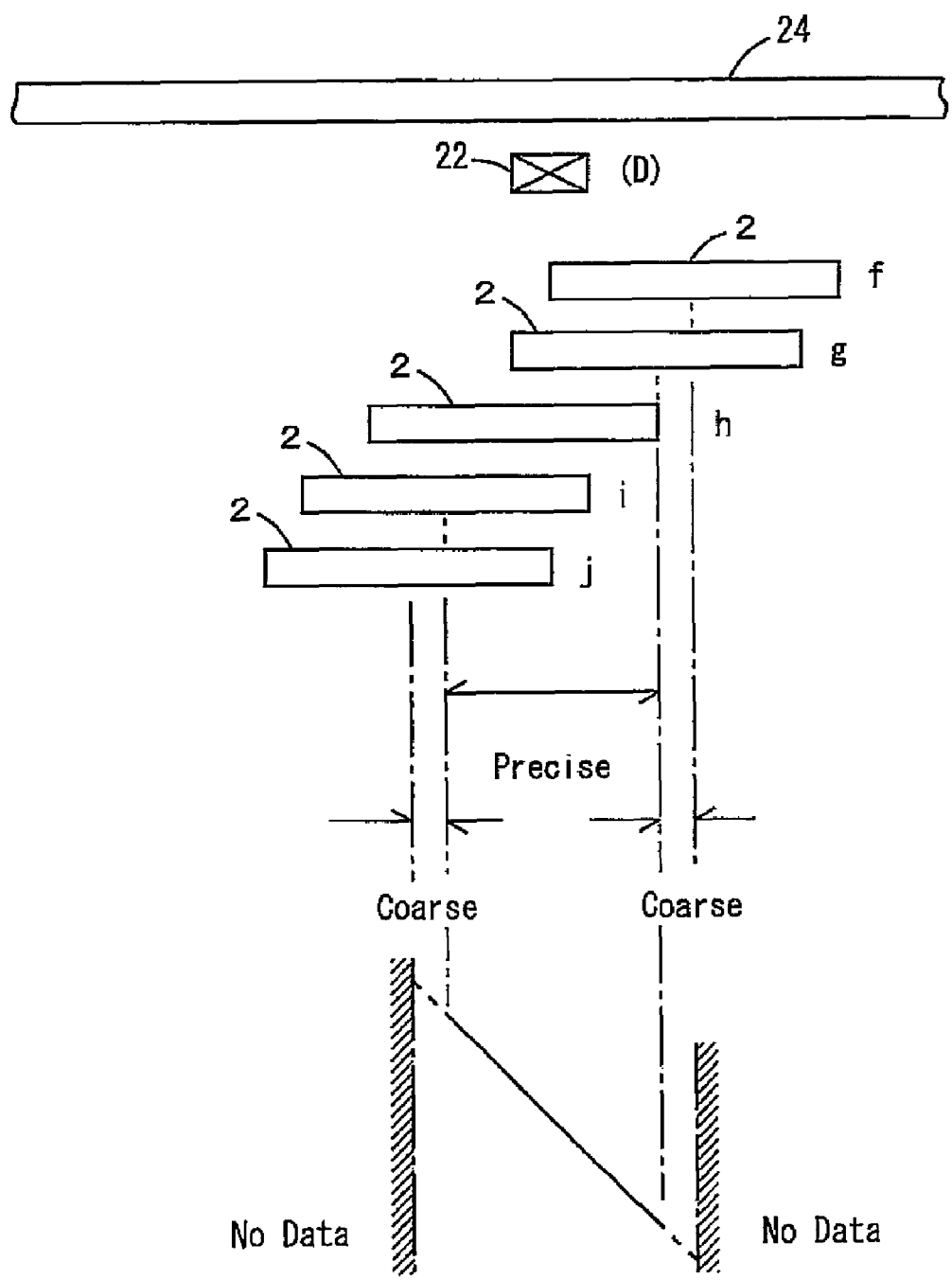
FIG. 3 is a view showing the relationship between a position of the detection head relative to the magnetic marks and output according to a discrete layout position specification.

FIG. 3 shows an output of the detection head according to the discrete layout specification. A magnetic mark labeled with (D) is provided along the travel route 24. It is assumed that the magnetic mark (D) is sufficiently remote from other magnetic marks. At a position "f", the detection head recognizes the magnetic mark (D). However, since the magnetic mark is positioned only at the left end of the coil array, detection precision is low. At a position "g", the coil array faces one magnetic mark 22. Therefore, detection precision at this position is the same as those obtained at respective points in the case of the entire range detection specification shown in FIG. 2. This state continues until a position "i". At a position "j", the coil array faces ½ of the magnetic mark. On the left side of the position "j", position recognition cannot be performed.

That is, in the above procedures, areas where no data is obtained from the detection head (area on the right side of the position "f"), areas where the current position is obtained with precision that is lower than that of entire range detection (areas between the position "f" and the position "g", and between the position "i" and the position "j"), and an area where the current position is obtained with precision that is the same as that of entire range detection (area between the position "g" and the position "i") are present. The detection range, e.g., mentioned in the claims means an area where position detection can be performed with precision that is the same as that of entire range detection.

FIG. 4 shows an example of the travel route 24. In the example, it is assumed that an overhead traveling vehicle is used as the moving vehicle. A reference numeral 30 denotes an inter-bay route and a reference numeral 31 denotes an intra-bay route having a loop shape. The travel route 24 includes a diverge section 32, a merge section 33, and curve sections 34. Load ports 35 are provided along the intra-bay route 31 as stop positions of the overhead traveling vehicle. In a discrete layout segment 36, for example, it is sufficient that the current position can be recognized only in areas in the vicinity of the load port 35. Therefore, the magnetic marks 22 are provided at the stop positions, and the overhead traveling vehicle travels between the magnetic marks while presuming positions using a rotary encoder or the like. At the stop position, stop control is implemented using the magnetic mark 22. In the diverge section 32, the merge section 33, and the curve sections 34, if the magnetic mark is provided, it may be interfere with the coil array undesirably. Therefore, the magnetic mark cannot be provided in these sections. For this reason, in detection disabled segments 38, the current position cannot be detected using the magnetic mark. In the other segments, entire range detection can be performed.

In this manner, in the inter-bay route 30 where traffic is heavy, interference between the overhead traveling vehicles can be prevented by precisely determining the current position. In the intra-bay route 31 where traffic is light, the magnetic mark 22 is provided only in areas in the vicinity of the stop positions such as the load ports 35. In the detection disabled segments 38, means other than the magnetic mark 22 is used for preventing interference between the overhead traveling vehicles. For example, exclusive control of traveling in the diverge section 32 and the merge section 33 is implemented by a ground controller (not shown) or the like. Further, before entry into the curve section 34, inter-vehicle distance between the overhead traveling vehicles is controlled to have a predetermined length or more.

Figure 5:
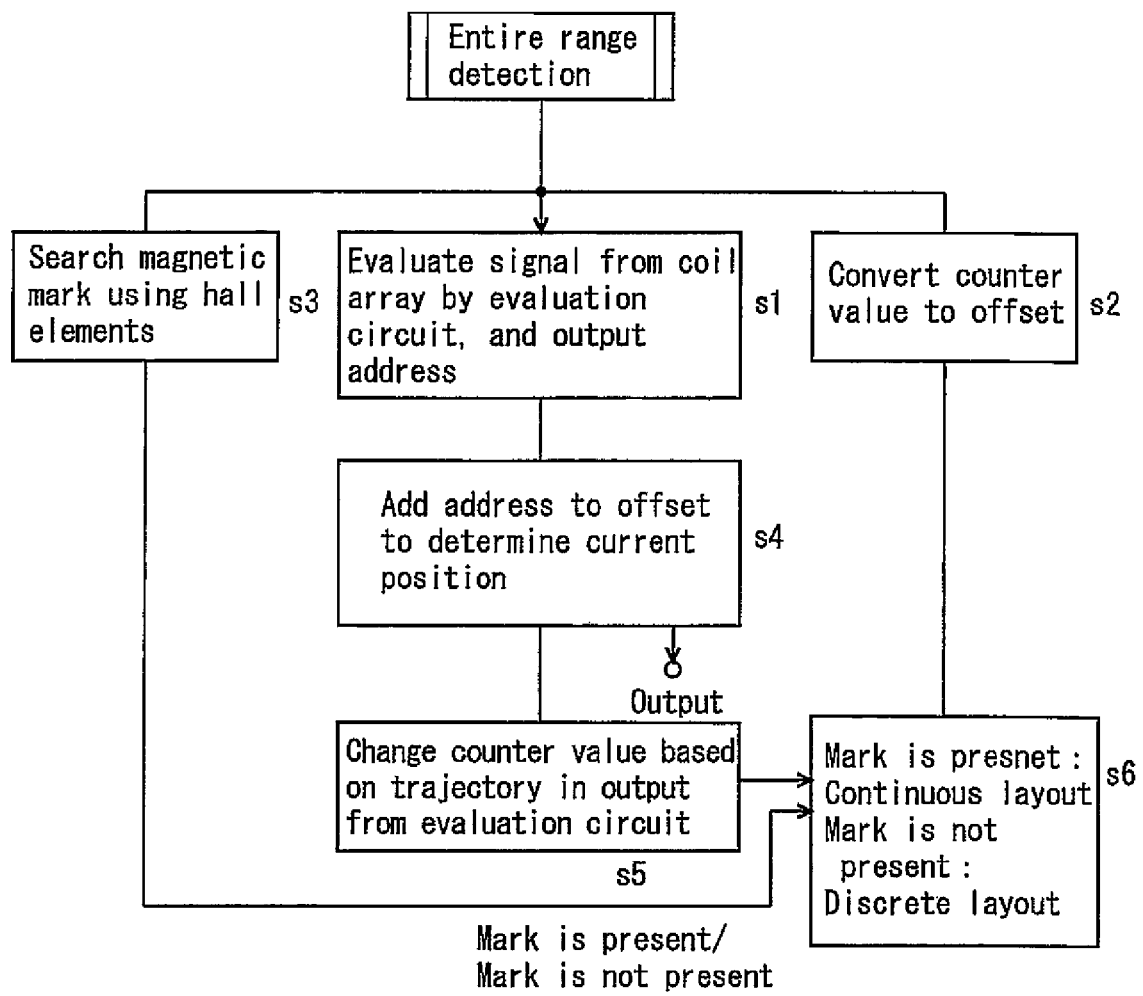
FIG. 5 is a flow chart showing processing according to the entire range detection specification.
Figure 6:
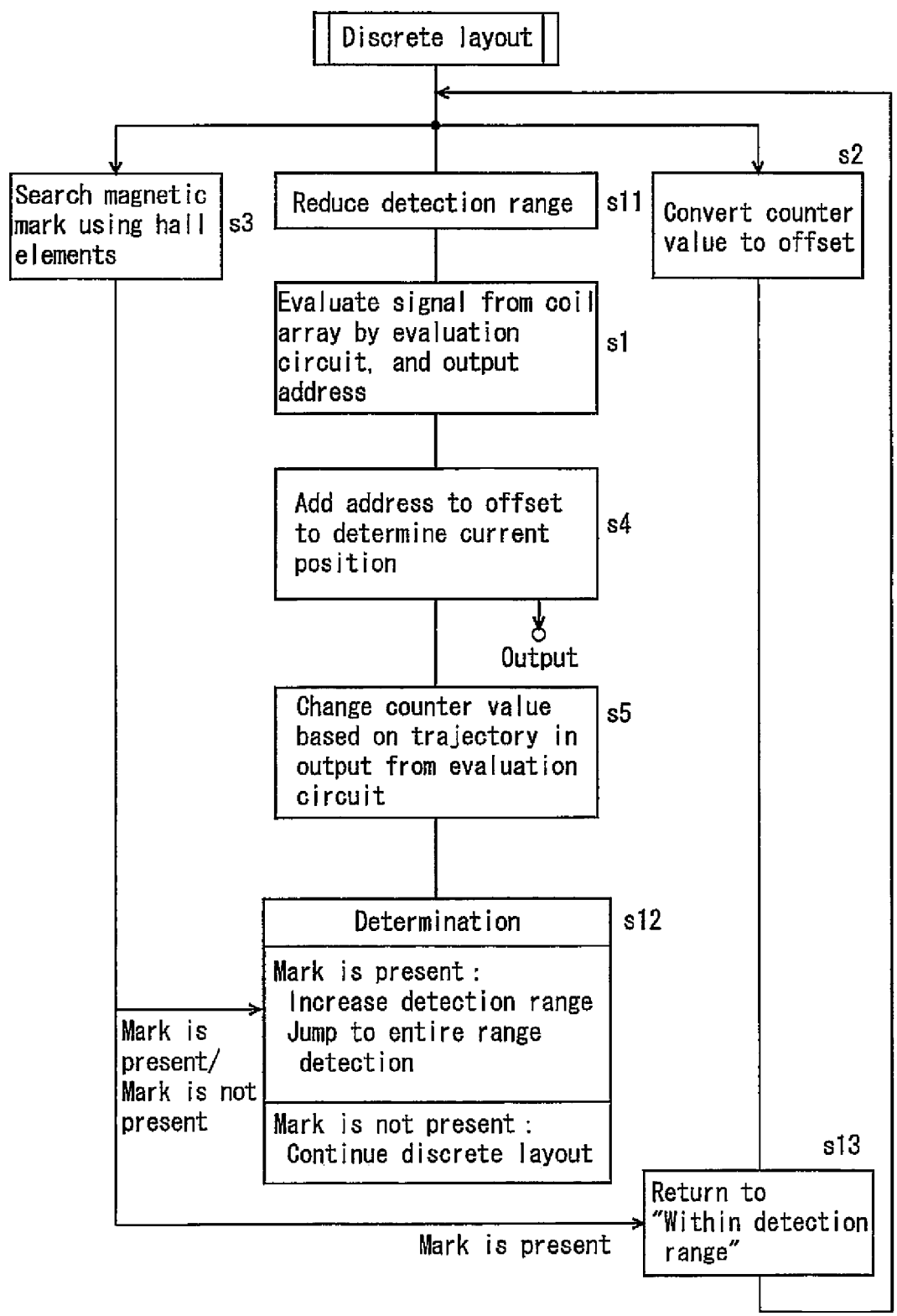
FIG. 6 is a flow chart showing processing according to the discrete layout position specification.

FIGS. 5 and 6 show algorithms of detecting the current position according to the entire range detection specification and the discrete layout specification. In the entire range detection specification, a signal from the coil array is evaluated by the evaluation circuit, and an address is outputted (step 1). Further, the counter value is converted to an offset (step 2), and the presence of the magnetic mark is searched using the hall elements (step 3). For example, the address is added to the offset for conversion to the current position, and the current position is outputted (step 4). Then, based on a trajectory outputted from the evaluation circuit, i.e., based on data indicating whether the output of the evaluation circuit is being increased or decreased, and data indicating whether the output of the evaluation circuit has reached a predetermined value or not, the counter value is incremented or decremented (step 5). Further, for example, in the case where the hall elements detect the next magnetic mark when the output of the evaluation reached a predetermined value, the algorithm of entire range detection (continuous detection) is maintained. In the case where the hall elements do not detect the next magnetic mark, it is presumed that the interval between the magnetic marks is wider than that of the entire range detection specification. Thus, switching to the algorithm according to the discrete layout specification is performed (step 6).

In FIG. 6, the steps that are identical to those in FIG. 5 are labeled with the same reference numerals. In the discrete layout specification, the detection range is reduced to a range where precise detection in FIG. 3 can be performed (step S11). In the detection range, the signal from the coil array is converted into an address (step 1). For example, the address is added to an offset determined from the counter value, and the current position is outputted (step 4). In the meanwhile, the magnetic mark is searched using the hall elements (step 3). Based on a trajectory outputted from the evaluation circuit, the counter value is incremented or decremented (step 5). Then, when the output of the evaluation circuit reaches a predetermined value, if the hall elements have detected the next magnetic mark, switching to the algorithm according to the entire range detection specification in FIG. 5 is performed, and if the hall elements have not detected the magnetic mark, the algorithm according to the discrete layout specification is maintained (step 12). Thereafter, for example, when the hall elements detect the next magnetic mark, the state of the detection head is returned to the state within the detection range (step 13).

Figure 7:
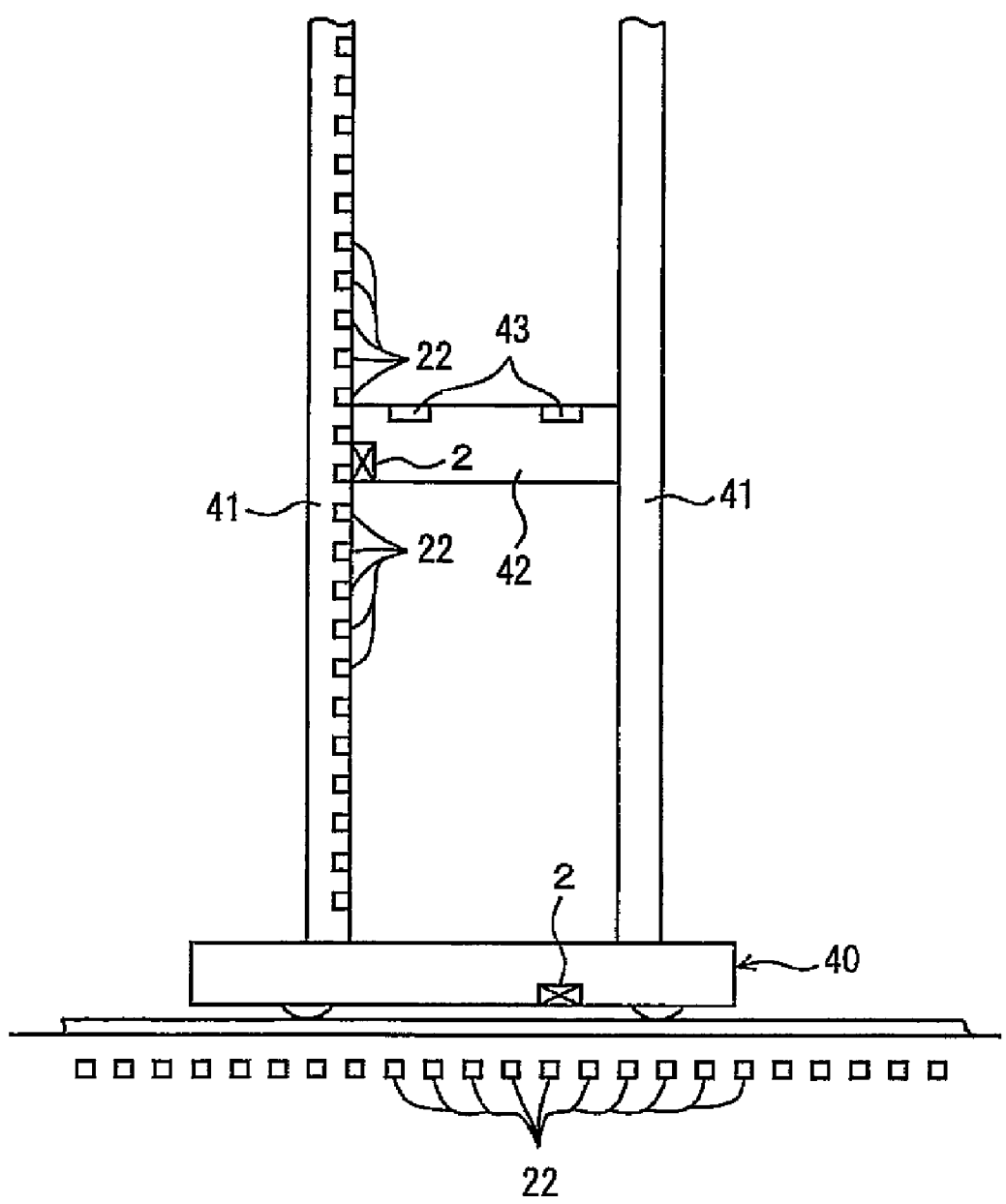
FIG. 7 is a view schematically showing a stacker crane system according to the embodiment.

FIG. 7 shows an example where a stacker crane 40 is used as the moving vehicle. The magnetic marks 22 are arranged along the travel rail or the like at the same pitch as the detection length of the coil array. Further, the magnetic marks 22 are arranged along the mast 41 at the same pitch as the detection length of the coil array of the detection head 2. Using these magnetic marks, the absolute position can be determined in both of horizontal and vertical directions. A reference numeral 42 denotes an elevation frame, and a reference numeral 43 denotes a transfer apparatus such as the slide fork. In the case where the stacker crane is used, the running range of the carrier and the elevation range of the elevation frame are constant. Both of running and elevation are straight movement. Therefore, preferably, the entire range detection specification is used in the entire stroke.

In the two embodiment, the two examples using the overhead traveling vehicle and the stacker crane are used. Additionally, the present invention is applicable to other moving vehicles such as a rail guided vehicle, a transfer apparatus having a base fixed on the ground, a working machine, or a conveyor.

In the embodiment, the following advantages are obtained.
(1) Even if the magnetic marks are provided at intervals separately from each other and one detection head is used, a segment where position detection can be made continuously is provided.
(2) Since the length of the coil array is the same as the arrangement pitch of the magnetic marks, the total length of the magnetic marks as viewed from the coil array is equal to one magnetic mark at all times, and the detection conditions are stabilized.
(3) The present invention is applicable to areas in straight segments where it is sufficient to perform position recognition in the vicinity of certain positions, and applicable to segments where magnetic marks cannot be arranged at a predetermined pitch, such as curve segments, diverge sections and merge sections, by providing magnetic marks at intervals of a distance which is wider than the detection length of the coil head. Further, in the case where the magnetic marks are arranged at a pitch equal to the detection length of the coil head in the entire range of the straight segment, the length of the straight segment is limited to an integral multiple of the arrangement pitch of the magnetic marks. In contrast, in the case where a segment where the magnetic marks are arranged at intervals of a distance that is wider than the detection length of the coil head, no constraints are present in respect of the length of the straight segment. Thus, for example, change in the layout of the intra-bay travel route such as change or addition of stop points become easy.
(4) By determining the magnetic mark that is being detected based on counting, the address determined by the coil head can be converted into the absolute position easily. Further, by counting the number of the magnetic marks, and storing the data in a non-volatile memory, restoration from blackout or the like can be performed easily.
(5) In the case where an intermediary offset table is provided instead of directly using a number or the like of the magnetic mark as an offset, even in the case of using discrete layout specification, the absolute position can be determined easily.
(6) By switching the detection range in correspondence with the detection of result of the magnetic mark by the magnetic sensor such as hall elements, even in the segment where the magnetic marks are arranged at wide intervals, the current position can be detected with the precision that is the same as in the case of the entire range detection specification.

The invention claimed is:

1. A moving vehicle system comprising:
   a moving vehicle with a detection head having a coil array comprising a plurality of coils along a moving direction of the moving vehicle;
   a first segment where magnetic marks are arranged along a moving route of the moving vehicle at a pitch equal to a length of the coil array in order to determine a position of the moving vehicle in the first segment continuously based on an output from the detection head;
   a second segment where the magnetic marks are arranged along the moving route at, at least, an interval that is wider than the pitch minus the length of the coil array; and
   means for detecting a presence of the magnetic mark to identify whether the moving vehicle is running along the first segment or the second segment, and means for changing a detection range of the detection head to output the position of the moving vehicle with predetermined precision over an entire range in the first segment, and output the position of the moving vehicle with the predetermined precision in the second segment for an area around the magnetic mark being that is narrower than the pitch.

2. A method of detecting a position of a moving vehicle, comprising the steps of:
   providing the moving vehicle with a detection head having a coil array comprising a plurality of coils along a moving direction of the moving vehicle;
   arranging magnetic marks along a first segment of a moving route of the moving vehicle at a pitch equal to a length of the coil array;
   detecting a position of the moving vehicle in the first segment continuously based on an output from the detection head;
   arranging the magnetic marks along a second segment of the moving route at, at least, an interval that is wider than the pitch minus the length of the coil array;
   detecting a presence of the magnetic mark to identify whether the moving vehicle is running along the first segment or the second segment; and
   changing a detection range of the detection head to output the position of the moving vehicle with predetermined precision over an entire range in the first segment, and to output the position of the moving vehicle with the predetermined precision in the second segment for an area around the magnetic mark that is narrower than the pitch.

* * * * *